United States Patent [19]
Friedrich et al.

[11] Patent Number: 4,859,514
[45] Date of Patent: Aug. 22, 1989

[54] LAMINATE FOR AN EASILY OPENED PACKAGE

[75] Inventors: Steven G. Friedrich, Greer; Kent A. Davis, Travelers Rest, both of S.C.

[73] Assignee: W. R. Grace & Co., Duncan, S.C.

[21] Appl. No.: 62,532

[22] Filed: Jun. 12, 1987

[51] Int. Cl.⁴ .............................................. B29D 22/00
[52] U.S. Cl. .................. 428/36.6; 428/36.7; 428/349; 428/516; 428/34.8
[58] Field of Search ............... 428/35, 349, 515, 516, 428/36.6, 36.7, 34.8; 206/524.2

[56] References Cited

U.S. PATENT DOCUMENTS

| | | | |
|---|---|---|---|
| 3,496,061 | 2/1970 | Freshour | 161/254 |
| 3,634,551 | 1/1972 | Stancell | 260/897 |
| 3,655,503 | 4/1972 | Stanley et al. | 156/272 |
| 3,808,304 | 4/1974 | Schirmer | 264/289 |
| 3,817,821 | 6/1974 | Gallini | 161/165 |
| 4,075,290 | 2/1978 | Denzel et al. | 260/897 |
| 4,189,519 | 2/1980 | Ticknor | 428/476 |
| 4,316,970 | 2/1982 | Hughes | 525/240 |
| 4,354,004 | 10/1982 | Hughes et al. | 525/240 |
| 4,382,513 | 5/1983 | Schirmer et al. | 206/484 |
| 4,615,926 | 10/1986 | Hsu et al. | 428/35 |
| 4,638,913 | 1/1987 | Howe, Jr. | 206/632 |
| 4,656,068 | 4/1987 | Raines | 428/35 |
| 4,665,130 | 5/1987 | Hwo | 525/222 |
| 4,666,778 | 5/1987 | Hwo | 428/412 |
| 4,680,340 | 7/1987 | Oreglia et al. | 525/72 |
| 4,720,420 | 1/1988 | Crass et al. | 428/349 |
| 4,729,476 | 3/1988 | Lulham et al. | 428/35 |
| 4,735,855 | 4/1988 | Wofford et al. | 428/349 |
| 4,740,421 | 4/1988 | Suzuki et al. | 428/349 |
| 4,756,421 | 7/1988 | Meek | 428/35 |
| 4,766,018 | 8/1988 | Hinrichsen et al. | 428/35 |
| 4,769,284 | 9/1988 | Kakugo et al. | 428/349 |

FOREIGN PATENT DOCUMENTS 55-35310 9/1980 Japan .

OTHER PUBLICATIONS

"Easy Open Seals for Flexible Packaging and Lidding", Future-pak '86, Dec. 3-5, 1986, pp. 55 and 61 through 78.

Primary Examiner—Edith Buffalow
Attorney, Agent, or Firm—John J. Toney; William D. Lee, Jr.; Mark B. Quatt

[57] ABSTRACT

A first web having an ionomer, or ionomer/ethylene vinyl acetate copolymer (EVA) sealant layer, heat sealed to a second web having an EVA/ethylene butene copolymer (EBC)/polypropylene (PP) sealant layer, forms an easily opened package. A layer adjacent the sealant layer of the second web optionally includes PP or ethylene propylene copolymer. With this optional layer, the sealant layer of the first web may comprise a polymeric material which forms strong interweb adhesion upon heat sealing.

4 Claims, 2 Drawing Sheets

LAMINATE FOR AN EASILY OPENED PACKAGE

BACKGROUND OF THE INVENTION

This invention relates generally to packaging and specifically to packaging laminates for food products.

It is common practice to package articles such as food products in thermoplastic films or laminates to protect the product to be packaged from abuse and exterior contamination, and to provide a convenient and durable package for transportation and sale to the end user.

Typical thermoplastic packaging films and laminates which provide the desired abuse protection and other desirable features in the finished package also tend to form strong heat seals when sealed together about the product. These materials, after heat sealing, are often difficult to open by the consumer or end user. It has therefore been desirable to have a packaging material which provides adequate protection of the product against environmental contaminants, moisture and air, and sufficiently strong heat seals to maintain the integrity of the package through the distribution channels and storage, and at the same time provide a heat seal which is easily opened i.e. easily peelable by the consumer or end user. Such an easy open feature avoids the need to tear apart the package with knife or other implements when it is desired to use the product.

It is also desirable to provide packaging materials with the above benefits and which in addition have bonding capabilities, so that upon packaging a product such as a food product, for example in a thermoforming process, an upper and lower laminate will bond in contiguous areas around and up to the product, providing a sufficiently strong bond between the laminates to maintain the integrity of the package and protection of the packaged product through the distribution cycle.

Another feature of a packaging system, which would be of great benefit to the food packaging industry, is the capability of providing approximately the same ease of openability under a wide range of sealing conditions. Currently, most easy-open systems will exhibit an easily peelable seal when an article is placed in the thermoformed web in a particular way. However, with variations in product placement and size, the bonded area of the final package can become greater. This in turn means that more work must be accomplished to open a particular package if the peel force remains the same. Ideally, an easy-open feature will permit packages to be opened with a sufficiently low, opening force to permit easy opening of the package regardless of product placement.

Of interest is U.S. Pat. No. 3,655,503 which issued to Hugh E. Stanley et al on Apr. 11, 1972. This reference shows a package of a composite, heat sealable thermoplastic film having an outer and inner layer with a relatively low interlayer bond strength. This film is used by overwrapping about the article to be packaged; the film is then heat-sealed to itself at overlapping seams. Ionomers are suitable resins for the outer layer and inner layer. The ionomer when used as an inner layer is used in conjunction with polypropylene. The present invention, in contrast, uses two distinct webs to package an article by thermoforming or other suitable means. The Stanley patent teaches an easily opened heat seal in which the heat seal zone comprising bonded outer layers of the overlapped film is first ruptured during opening, and then delamination starts along the interface between an outer and inner layer. At the end of the heat seal zone, the outer layer is once again ruptured to complete the peeling of the package. Rupturing and delamination may occur more than once throughout the heat seal zone during opening. The reference shows only a single resin used in the outer or an inner layer.

Also of interest is U.S. Pat. No. 4,178,401 issued to Alan S. Weinberg et al. This reference discloses a self-welding packaging film in which the inner or self-welding layer is a blend of ethylene vinyl acetate copolymers with differing melt flow indices. Blends of ionomer of low melt flow with ethylene vinyl acetate copolymers with high melt flow are also disclosed, but these latter blends show poor self-eldability. An easily peelable heat seal is not shown.

Also of interest is U.S. Pat. No. 4,382,513 issued to Henry G. Schirmer et al on May 10, 1983. This patent discloses a package having a peelable heat seal wherein unoriented films are irradiated to control the bond strength of the resulting heat seal. Ionomers of ethylene and ethylene vinyl acetate copolymer are possible sealing layers of thermoplastic films used with this irradiated process.

It is an object of the present invention to provide a package which is made from materials including sealing layers of incompatible materials, thereby providing an easily opened seal.

It is a further object of the present invention to provide a package for food products which includes a first web and a second web which bond to each other along their contiguous surfaces during a thermoforming process.

It is a further object of the present invention to provide a package for food products which has good bonding characteristics and good seal strength, yet is easily peelable through both the bonded areas and fusion seal areas of the package.

It is also an object of the present invention to provide a heatsealed package which can be easily opened with a relatively consistent, low seal opening force, over a relatively wide range of sealing conditions.

SUMMARY OF THE INVENTION

The present invention relates to an easily opened package comprising a first web including a sealant layer comprising a polymeric material selected from the group consisting of ionomer and a blend of ethylene vinyl acetate copolymer and an ionomer; a second web including a sealant layer comprising a blend of ethylene vinyl acetate copolymer, ethylene butylene copolymer, and polypropylene; the first and second webs being heat-sealed to each other and enclosing an article.

In another aspect, the subject invention is a process for producing an easily opened package comprising forming a first web having a sealant layer comprising a polymeric material selected from the group consisting of ionomer and a blend of ethylene vinyl acetate copolymer and an ionomer; placing the article on the first formed web; disposing the second web having a sealant layer comprising a blend of ethylene vinyl acetate compolymer, ethylene butene copolymer, and polypropylene over the product to form an enclosure; heating the second web; vacuumizing the enclosure; heat sealing the first and second webs at or near the periphery of the package; and causing the heated web to tack to the first web so as to enclose the article between the webs and bond the first and second webs to form a package.

DESCRIPTION OF THE DRAWINGS

In the drawings which are attached hereto and made a part of this disclosure.

DEFINITIONS

Figure 1:
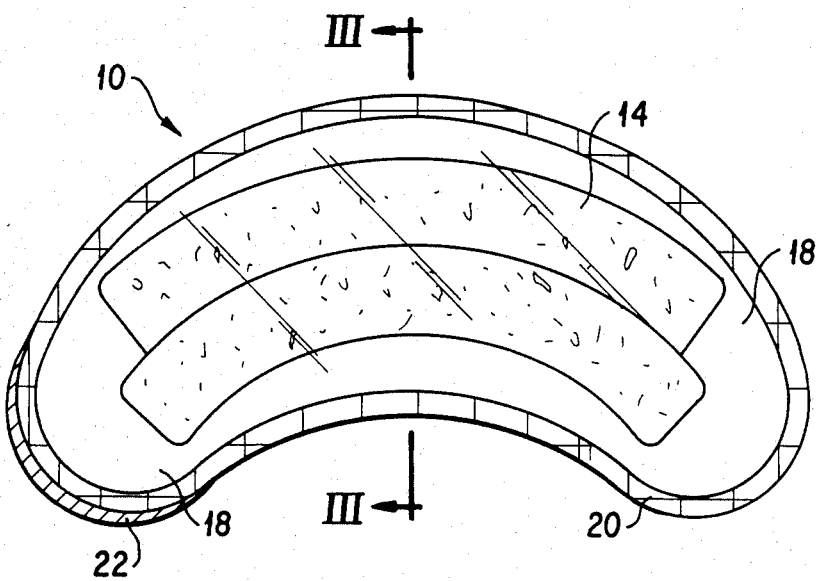
FIG. 1 is a plan view of a package which may be made in accordance with the present invention.
Figure 2:
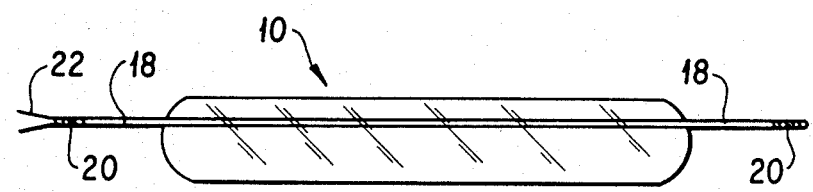
FIG. 2 is a side view of a package made in accordance with the invention.
Figure 3:
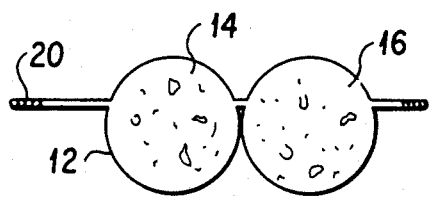
FIG. 3 is a cross-sectional view taken along line III—III of FIG. 1.

"Easily peelable" and like terminology is used herein to refer to a package, and specifically heat-sealed and bonded areas of a package, which are readily peelable without tearing or rupturing the packaging materials which may result in premature destruction of the package and inadvertent contamination of the contents of the package. An easily peelable package is one which can be peeled without resort to a knife or other implement to tear open the package.

"Bonding" and like terminology is used herein to refer to materials which adhere to each other in a contact seal and will stay bonded through normal commercial distribution without external force. This adherent or contact bond is maintained by the strength of the bond alone and is not due to any extraneous force pushing the film sheets or package walls together, other than atmospheric pressure. "Bonding" herein is therefore not used in its usual sense of interlaminar or interlayer adhesion in a multilayer polymeric structure.

"Perimeter seal" and like terminology is used herein to denote a sell around the peripheral area of the package, made under heat and mechanical pressure and for a sufficient duration of time to fuse the sealing surfaces of the respective webs.

"Ionomer" is used herein to refer to metal salts of ethyleneacrylic or methacrylic acid copolymers having pendent carboxylate groups associated with monovalent or divalent cations such as zinc or sodium.

"Ethylene-butene copolymer" is used herein to refer to copolymers of butene-1 and ethylene.

DETAILED DESCRIPTION OF THE PREFERRED EMBODIMENTS

Referring to the drawings, package 10 has a first web 12 which is a forming web produced by thermoforming or other suitable techniques well known in the art. Suitable thermoforming methods, for example, include a vacuum forming or plug-assist vacuum forming method. In a vacuum forming method, the first web is heated e.g. by a contact heater or infrared method and a vacuum is applied beneath the web causing the web to be pushed by atmospheric pressure down into a preformed mold. Alternatively, after heating the first web, air pressure is applied above the web to push the web down into a preformed mold by applied pressure. In a plug-assist vacuum forming method, after the first or forming web has been heated and sealed across a mold cavity, a plug shape similar to the mold shape impinges on the forming web and, upon the application of vacuum, the forming web transfers to the mold surface.

After the forming web is in place, a food product 14 such as link sausage is placed, such as by manual loading, on the forming web and a second, substantially non-forming web 16 is disposed over the product and heated by a heating plate. The chamber containing the first and second webs is vacuumized, thereby vacuumizing the enclosure formed by the first and second webs. A perimeter seal is applied within the chamber by a descending seal platen. A release of vacuum causes the forming web to press against and bond to the non-forming web so as to enclose the product between the webs and create a bonded area 18 of the first and second webs at their contiguous surfaces. The first or forming web encloses a substantial portion, generally more than half, of the product to be packaged.

The first and second webs are preferably made from a shrinkable material i.e. a material which has been oriented such as by stretch orienting and which will shrink about the product upon elevating the temperature of the film or laminate. Thus, the package may be treated by a brief exposure to heat, in the form of hot air or hot water or steam, to shrink the formed laminate around the product to achieve a tight and wrinkle-free package, and also to insure that the sealing surfaces i.e. the bonded areas 18 in contact with each other adhere firmly to achieve excellent clarity and resistance to loss of package vacuum in the event that a packaging material is punctured.

A first or forming web made from unoriented material in accordance with the preferred embodiment of this invention will exhibit shrinkage about the product to be packaged after thermoforming and exposure to hot air or hot water. This shrinkage results from orienting of the material that occurs in the forming station.

Before the first and second webs have been bonded and preferably before the shrinking operation described above is performed, the peripheral edge of the package is sealed such as by a heated platen using techniques well known in the art. This perimeter seal 20 is located at or near the actual periphery of the package. In a preferred embodiment, a portion of the peripheral area around the package is extended, forming an external flap 22 providing a means for easily opening the package. The contiguous surfaces of the first web 12 and second web 16 are not completely sealed in the region of this external flap, thereby facilitating the use of the easy-open mechanism in accordance with the invention by including a convenient means for pulling apart the package.

The laminate of the first or forming web 12 includes a sealant layer 24 (see FIGS. 4 and 5) comprising an ionomer or a blend of an ethylene vinyl acetate copolymer and an ionomer. The ethylene vinyl acetate copolymer contains preferably between about 6% and 20% vinyl acetate by weight. The ionomer is preferably a zinc ionomer, such as Surlyn 1705 available from DuPont Company, but may be a sodium ionomer as well. The ratio of ethylene vinyl acetate (EVA) to the ionomer may be from about 50% EVA/50% ionomer to about 0% EVA/100% ionomer.

The laminate forming the second, substantially non-forming web 16 likewise includes a sealant layer of a blend of EVA, ethylene butene copolymer (EBC) and polypropylene (PP). The sealant layer preferably has a thickness of between about 0.2 and 0.5 mils, and most preferably about 0.3 mils. EVA resins having between about 6% and 20% vinyl acetate by weight are preferred. A suitable resin is Elvax 3134, an EVA with 9% vinyl acetate by weight, and commercially available from du Pont.

The EBC is commercially available from Shell Oil Company as Shell PB-8240, and is believed to comprise a copolymer of 1-butene with a relatively small amount of ethylene.

The polypropylene is also available from Shell in the form of a resin designated Shell PP WRS 5-660. NPP 2004 MR commercially available from Norchem is also suitable for use in the present invention.

The three-component blend of the sealant layer preferably comprises a major portion of EVA, with a relatively smaller proportion of EBC and an even lesser amount of polypropylene.

More preferably, the blend comprises between about 70% and 90% ethylene vinyl acetate copolymer, between about 5% and 25% EBC, and between about 2% and 6% polypropylene.

Most preferably, the blend comprises about 75% ethylene vinyl acetate copolymer, 20% EBC, and 5% PP.

All of the above percentages are by weight. Those skilled in the art will recognize that these percentages may vary slightly as a result of inclusion or application of additives to the sealant layer.

For example, in the preferred embodiment, about 0.2% anti-block agent is added to the blend, at the expense of the EVA, i.e. reducing the EVA by a like amount. A preferred anti-block agent is a diatomaceous silica, $SiO_2$, which is available from McCullough & Benton, Inc. under the tradename Superfine Superfloss. Antiblock is advantageously used as a processing aid.

In an alternate embodiment, the sealant layer comprises 86% EVA, 7% EBC, 3% PP and 4% anti-block. The antiblock in this alternate embodiment is preferably an ionomer blended with about 12.5% of antiblock agent as described above.

The second web also optionally includes a layer adjacent to the sealant layer of an ethylene propylene copolymer (EPC) or polypropylene. A preferable EPC contains between about 2% and about 6% ethylene by weight. The sealant layer and immediately adjacent layer are preferably coextruded.

The easy-open mechanism according to the present invention works as follows. The product can be link sausage or other food products. A perimeter seal is formed at or near the periphery of the package at a certain range of temperatures. Subsequently, the first and second webs, during thermoforming or like process, are bonded at their contiguous surfaces in an area between the end of the enclosed product and the Peripheral seal 20 and pull tab 22. This bonding occurs under substantially the same temperature conditions as for the perimeter seal, but under generally lower pressure and lower dwell times. Typically, the bonding occurs under atmospheric pressure.

Figure 4:
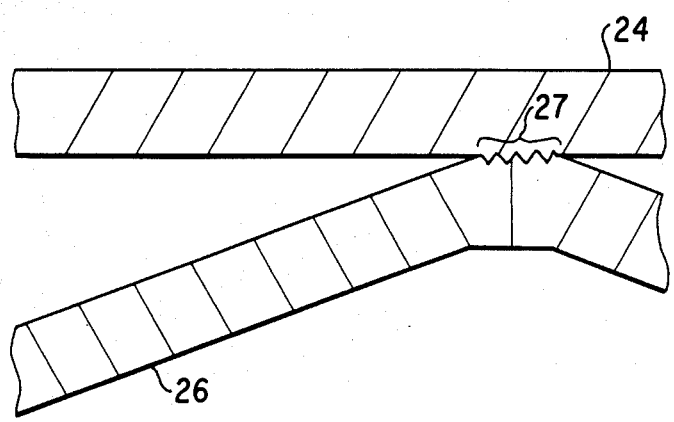
FIG. 4 is a schematic representation of the sealed area of the package in one embodiment of the invention.
Figure 5:
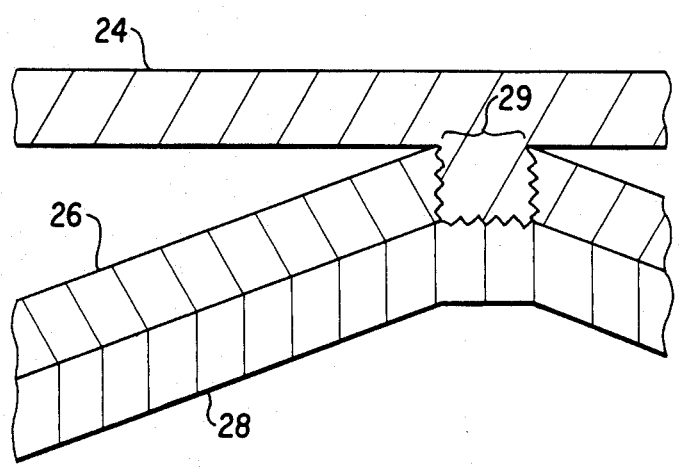
FIG. 5 is a schematic representation of the sealed area of the package in an alternate embodiment of the invention.

Two mechanisms control the easy peelability of the resulting package (see FIGS. 4-5).

In the first mechanism, the sealant layers as described above are used for the first and second webs respectively. In a multilayer embodiment, the first or forming web comprises a structurally sound web with an ionomer or ionomer and EVA blend sealant layer. The second web comprises a structurally sound multilayer structure with the EVA/EBC/PP blend ealant layer. The interlayer adhesion between layers of the first web, and adhesion between layers of the second web, is designed to exceed the interweb adhesion between the respective sealant layers in the bonded and perimeter seal areas.

When the pull tab 22 is pulled apart by the end user, the package will easily peel apart along the seal interface between seal layer 24 of the first web, and seal layer 26 of the second web. Typical peel force required to open the package is less than 2.5 pounds per inch. The zigzag line of FIG. 4 shows the path of opening along the sealed area 27 (bonded area and perimeter seal) of the package.

In some cases, product placement in the thermoformed first web during a thermoforming operation, or variation in product size, results in a larger bonded area 18, as depicted in FIG. 1. For example, in the case of link sausages, some variability exists in the particular placement of a sausage or group of sausages in the thermoformed first web. When the sausages are placed further toward the pull tab end of the package, a smaller bonded area 18 is produced in that sector of the package between the pull tab and the product. When the sausages are placed further away from the pull tab end of the package, a larger bonded area results. In opening the package, in each case, the perimeter seal as well as the bonded area must be traversed before access to the product can be obtained. While the actual peel force may be the same in both examples, more work will be required to open the package with the larger bonded area.

To solve this problem, a second mechanism in accordance with this invention can be used. The layer adjacent the EVA/EPC/PP sealant layer of the second web comprises a polypropylene or ethylene propylene copolymer. It has been found that when the pull tab 22 is pulled apart in this construction, a tear-out occurs in the bonded and perimeter seal areas of the package. This is graphically depicted in FIG. 5. The sealant layer ruptures, and as opening proceeds, the sealant layer 26 delaminates from the immediately adjacent polypropylene or EPC layer of the second web. This is made possible because the bond between sealant layer 26 and adjacent layer 28 is weaker in the bond and perimeter seal areas 18 and 20 of the package than the adhesion between sealant layer 26 and sealant layer 24 of the first or forming web. Upon further opening, the sealant layer 26 ruptures again, and the package is opened. The zigzag lines of FIG. 5 show the path of opening in the sealed area 29 of the package. Of course, sealant layer 26 itself must be of sufficiently low strength to permit rupture of the sealant layer to occur.

This sequence occurs at a peel force below 2.5 pounds per inch, and often below 1.5 pounds per inch. Compared with typical commercial easy-open packages having peel-open forces of 2.5 to 4 pounds per inch, a package made in accordance with the present invention is very easy to open.

The package in accordance with the present invention provides not only exceptional openability, but also good package integrity during storage, shipment, and display. The bonded area 18 of the package helps to insure that the package remains intact and hermetically sealed, and that the contained food product is adequately protected from exposure to the environment around the package.

One important attribute of the forming web in accordance with the present invention is that the interlaminar adhesive strength of the layers making up the forming web must be greater than the adhesive strength of the sealant layers of the first and second webs. This is necessary to limit the possible mechanisms for peeling to those described above, i.e. separation of incompatible sealant layers, or delamination of the sealant/EPC or polypropylene interface of the non-forming web.

For convenience the second web may be referred to as a "non-forming" web, although in fact some forming of the web may be said to take place during a thermoforming or similar process.

A package is thus provided which includes a reliable easy-open feature in a shrinkable laminate package by utilizing two methodologies; the first dictated by incompatibilities between the sealant layers of the forming and non-forming webs, and the second provided by controlled delamination of the sealing layer and an immediately adjacent EPC or polypropylene layer in the non-forming web, and a sealant layer with sufficiently low strength to promote rupture of the layer.

Several forming and non-forming webs may be utilized in accordance with the present invention. Certain forming webs were used in combination with various non-forming webs to produce thermoformed packages. The first group listed below were tested and exhibited the peel mechanism along the interface between the respective sealant layers when the packages were opened. In Group 1, each of the non-forming webs was hermetically heat sealed to a structurally sound web with an ionomer or ionomer and EVA blend sealant layer.

| Group I: Non-Forming Web - Peel Mechanism | | | | | | | |
|---|---|---|---|---|---|---|---|
| 1. | 74.8% $EVA_1$<br>20.0% $EBC_1$<br>5% $PP_1$<br>0.2% $Antiblock_1$ | EVA-Based $Adhesive_1$ | $Nylon_1$ | $EVOH_1$ | $Nylon_1$ | EVA-Based $Adhesive_2$ | $PP_2$ |
| 2. | 74.9% $EVA_1$<br>20.0% $EBC_1$<br>5.0% $PP_3$<br>0.1% $Antiblock_1$ | $EVA_2$ | $EVA_2$ | $Adhesive_1$ | Print Layer | Coated Biaxial $Nylon_2$ | |
| 3. | 75% $EVA_1$<br>20% $EBC_1$<br>5% $PP_4$ | $EVA_2$ | $EVA_2$ | $Adhesive_1$ | Coated Biaxial $Nylon_2$ | | |

In the second Group of structures, each of the non-forming webs was hermetically sealed to a forming web with strong internal adhesion to prevent delamination or cohesive failure. A strong interweb seal was made. Each of the structures exhibited a tear-out easy-open mechanism.

| Group II: Non-Forming Web - Tear Out Mechanism | | | | | | | | |
|---|---|---|---|---|---|---|---|---|
| 4. | 74.8% $EVA_1$<br>20.0% $EBC_1$<br>5% $PP_1$<br>0.2% $Antiblock_1$ | $EPC_1$ | $EPC_2$ | EVA Based $Adhesive_1$ | $EVOH_2$ | EVA-Based $Adhesive_1$ | $EPC_2$ | $EPC_1$ | $PP_2$ |
| 5. | 86.0% $EVA_1$<br>7.0% $EBC_1$<br>3.0% $PP_1$<br>4.0% $Antiblock_2$ | $EPC_1$ | $EPC_2$ | EVA Based $Adhesive_1$ | $EVOH_2$ | EVA-Based $Adhesive_1$ | $EPC_2$ | $EPC_1$ | $PP_2$ |
| 6. | 81% $EVA_1$<br>10% $EBC_1$<br>5% $PP_1$<br>4% $Antiblock_2$ | $EPC_1$ | $EPC_3$ | EVA Based $Adhesive_1$ | $EVOH_2$ | EVA-Based $Adhesive_1$ | $EPC_3$ | $EPC_1$ | $PP_2$ |
| 7. | 70% $EVA_1$<br>20% $EBC_1$<br>5% $PP_1$<br>5% $Antiblock_2$ | $EPC_1$ | $EPC_3$ | EVA Based $Adhesive_1$ | $EVOH_2$ | EVA-Based $Adhesive_1$ | $EPC_3$ | $EPC_1$ | $PP_2$ |
| 8. | 64.9% $EBC_1$<br>29.9% $EVA_1$<br>5% $PP_1$<br>0.2% $Anitblock_1$ | $EPC_1$ | $EPC_3$ | EVA Based $Adhesive_1$ | $EVOH_2$ | EVA-Based $Adhesive_1$ | $EPC_3$ | $EPC_1$ | $PP_2$ |
| 9. | 74.8% $EVA_1$<br>20.0% $EBC_1$<br>5.0% $PP_1$<br>0.2% $Antiblock_1$ | $EPC_1$ | 50% $LLDPE_1$<br>50% $LLDPE_2$ | $Nylon_3$ | $EVOH_3$ | $Nylon_3$ | 50% $LLDPE_1$<br>50% $LLDPE_2$ | $EPC_1$ | $PP_2$ |
| 10. | 74.8% $EVA_1$<br>20.0% $EBC_1$<br>5.0% $PP_1$<br>0.2% $Antiblock_1$ | $EPC_1$ | $EPC_3$ | EVA Based $Adhesive_1$ | $EVOH_2$ | EVA-Based $Adhesive_1$ | $EPC_3$ | $EPC_1$ | $PP_2$ |
| 11. | 74.8% $EVA_1$<br>20.0% $EBC_1$<br>5.0% $PP_1$<br>0.2% $Antiblock_1$ | $EPC_1$ | $EPC_3$ | $LLDPE_1$ | $EVOH_2$ | $LLDPE_1$ | $EPC_3$ | $EPC_1$ | $PP_2$ |
| 12. | 74.8% $EVA_1$<br>20.0% $EBC_1$<br>5.0% $PP_5$<br>0.2% $Antiblock_1$ | $EPC_1$ | $EPC_3$ | PP Based $Adhesive_1$ | $EVOH_2$ | PP-Based $Adhesive_1$ | $EPC_3$ | $EPC_1$ | $PP_2$ |
| 13. | 74.8% $EVA_1$<br>20.0% $EBC_1$<br>5.0% $PP_1$<br>0.2% $Antiblock_1$ | $EPC_4$ | $EPC_3$ | $LLDPE_2$ | $EVOH_2$ | $LLDPE_2$ | $EPC_3$ | $EPC_4$ | $PP_2$ |
| 14. | 74.8% $EVA_1$<br>20.0% $EBC_1$<br>5.0% $PP_1$ | $EPC_4$ | $EPC_3$ | EVA Based $Adhesive_1$ | $EVOH_2$ | EVA-Based $Adhesive_1$ | $EPC_3$ | $EPC_4$ | $PP_2$ |

-continued

| | | | | Group II: Non-Forming Web - Tear Out Mechanism | | | | | |
|---|---|---|---|---|---|---|---|---|---|
| 15. | 0.2% Antiblock₁ 74.8% EVA₁ 20.0% EBC₁ 5.0% PP₁ | EPC₄ | EPC₃ | EVA Based Adhesive₁ | 90% EVOH₂ 10% Nylon₃ | EVA-Based Adhesive₁ | EPC₃ | EPC₄ | PP₂ |
| 16. | 0.2% Antiblock₁ 74.8% EVA₁ 20.0% EBC₁ 5.0% PP₃ | EPC₄ | EPC₃ | EVA Based Adhesive₁ | EVOH₂ | EVA-Based Adhesive₁ | EPC₃ | EPC₄ | PP₂ |
| 17. | 0.2% Antiblock₁ 74.8% EVA₁ 20.0% EBC₁ 5.0% PP₁ 0.2% Antiblock₁ | EPC₄ | EPC₃ | 50% EVA-Based Adhesive₁ 48.5% LLDPE₁ 1.5% Ampacet 10436 | EVOH₂ | 50% EVA-Based Adhesive₁ 48.5% LLDPE₁ 1.5% Ampacet 10436 | EPC₃ | EPC₄ | PP₂ |
| 18. | 73.4% EVA₁ 20.0% EBC₁ 5.0% PP₁ 1.5% Ampacet 0.1% Antiblock₁ | EPC₄ | EPC₃ | 98.5% LLDPE₁ 1.5% Ampacet 10436 | EVOH₂ | 98.55 LLDPE₁ 1.5% Ampacet 10436 | EPC₃ | EPC₄ | PP₂ |
| 19. | 74.8% EVA₁ 20.0% EBC₁ 5.0% PP₁ 0.2% Antiblock₁ | EPC₄ | EVA-Based Adhesive₁ | Nylon₁ | EVOH₁ | Nylon₁ | | EVA-Based Adhesive₂ | PP₂ |
| 20. | 74.9% EVA₁ 20.0% EBC₁ 5.0% PP₃ 0.1% Antiblock₁ | EPC₄ | EVA₂ | Adhesive₁ | Coated Biaxial Nylon₂ | | | | |
| 21. | 75% EVA₁ 20.% EBC₁ 5.% PP₄ | EPC₄ | EVA₂ | Adhesive₁ | Coated Biaxial Nylon₂ | | | | |
| 22. | 75% EVA₁ 20% EBC₁ 5% PP₄ | EPC₁ | EVA₂ | Adhesive₁ | Coated Biaxial Nylon₂ | | | | |

A third group of structures includes each of the structures identified above in Group II, and hermetically heat sealed to a structurally sound web with an ionomer or ionomer and EVA blend sealant layer. These structures exhibited both the peel and tear out mechanisms. Variations in seal conditions can exist within a given package made in accordance with the present invention. These variations, which can be present in both the bonded and perimeter seals of the package, can be caused by variability in equipment operation, proximity of the material to the food product, product positioning, and other factors. The combination peel/tear out mechanism permits easy opening of the package by providing peel in some areas of the package, tear out in other areas of the package, with a low and relatively constant peel force of generally less than 2.5 pounds per inch, and preferably less than 1.5 pounds per inch.

Examples of the structurally sound webs with an ionomer or an ionomer and EVA blend sealant layer are listed below as Group IV.

| | | | | Group IV: Forming Webs | | | | | |
|---|---|---|---|---|---|---|---|---|---|
| 23. | Ionomer₁ | EVA Based Adhesive₁ | Nylon₁ | EVOH₁ | Nylon₁ | EVA-Based Adhesive₂ | PP₂ | | |
| 24. | Ionomer₂ | EVA Based Adhesive₁ | Nylon₁ | EVOH₁ | Nylon₁ | EVA-Based Adhesive₂ | PP₂ | | |
| 25. | Ionomer₃ | Ionomer₁ | EVA₂ | Adhesive₁ | Coated Biaxial Nylon₂ | | | | |
| 26. | Ionomer₁ | Ionomer₃ | EVA₂ | Adhesive₁ | Coated Biaxial Nylon₂ | | | | |
| 27. | Ionomer₂ | EVA₂ | Adhesive₁ | Print Layer | Saran | Coated Biaxial Nylon₂ | | | |
| 28. | 50% EVA₃ 50% Ionomer₄ | EVA-Based Adhesive₁ | EPC₁ | EPC₂ | EVA-Based Adhesive₁ | EVOH₂ | EVA-Based Adhesive₁ | EPC₂ | EPC₁ PP₂ |
| 29. | 25% EVA₃ 75% Ionomer₄ | EVA-Based Adhesive₁ | EPC₁ | EPC₂ | EVA-Based Adhesive₁ | EVOH₂ | EVA-Based Adhesive₁ | EPC₂ | EPC₁ PP₂ |
| 30. | 25% EVA₄ 71% Ionomer 4% Antiblock₂ | EVA-Based Adhesive₁ | EPC₁ | EPC₂ | EVA-Based Adhesive₁ | EVOH₂ | EVA-Based Adhesive₁ | EPC₂ | EPC₁ PP₂ |

LEGEND

| | | |
|---|---|---|
| EVA₁ = | ELVAX 3134 | (du Pont) |
| EVA₂ = | PE204-CS95 | (El Paso) |
| EVA₃ = | 3130 SB | (du Pont) |
| EVA₄ = | ELVAX 3190 | (du Pont) |
| EBC₁ = | Shell PB 8240 | (Shell Oil Company) |
| PP₁ = | Shell WRS 5-660 | (Shell Oil Company) |
| PP₂ = | NPP 2085 GW | (Norchem) |

| | | |
|---|---|---|
| PP$_3$ = | Shell PP 5820 | (Shell Oil Company) |
| PP$_4$ = | NPP 2004 MR | (Norchem) |
| Antiblock$_1$ = | Super Floss | (McCullough & Benton, Inc.) |
| Antiblock$_2$ = | Conpol 8750 | (du Pont) |
| EVA-Based Adhesive$_1$ = | CXA-E162 | (du Pont) |
| EVA-Based Adhesive$_2$ = | Plexar 3 | (Norchem) |
| Nylon$_1$ = | Ultramid 602U | (BASF) |
| Nylon$_2$ = | Emblem 1515 | (Allied) |
| Nylon$_3$ = | XPN 1539 | (Allied) |
| EVOH$_1$ = | EVAL EC-F101 | (EVAL Co. of America) |
| EVOH$_2$ = | EVAL EP-H 101 A | (EVAL Co. of America) |
| EVOH$_3$ = | EVAL EP-K102 | (EVAL Co. of America) |
| Adhesive$_1$ = | LAMAL 408-40 | (Polymer Industries) + |
| | LAMAL "C" Catalyst Methanol | (Polymer Industries) + |
| EPC$_1$ = | Dypro Z-7650 | (Cosden) |
| EPC$_2$ = | PP 3303 GK | (Norchem) |
| EPC$_3$ = | Dypro W-431 | (Cosden) |
| EPC$_4$ = | Dypro 7670 | (Cosden) |
| LLDPE$_1$ = | Primacor XU 61515.02L | (Dow) |
| LLDPE$_2$ = | Primacor XU 61515.05L | (Dow) |
| Ionomer$_1$ = | Surlyn 1650 | (du Pont) |
| Ionomer$_2$ = | Surlyn 1702 | (du Pont) |
| Ionomer$_3$ = | Surlyn 1601 | (du Pont) |
| Ionomer$_4$ = | Surlyn 1705 | (du Pont) |
| PP-Based Adhesive$_1$ = | ER 3341 | (Exxon) |

The first or forming webs as described above are preferably produced by coextrusion, by means well known in the art.

The second or non-forming webs may be produced by lamination or by cast coextrusion.

The presence of an anti-block concentrate in the sealant layer of several embodiments of the forming and non-forming webs assures that wrinkling and tackiness of the sealant layer during extrusion and specifically during bubble collapse is substantially avoided. A secondary benefit in using small amounts of anti-block in the sealant layer is that the package flap 22 needed for peelable seals is easy to open.

Although in the preferred embodiments the ionomer or blend of EVA and ionomer is shown in the sealant layer of the forming web, and EVA/EBC/PP is shown in the sealant layer of the second or non-forming web, these compositions can be reversed. Thus, the forming web could include a sealant layer of EVA/EBC/PP and the non-forming web could include a sealant layer having an ionomer or a blend of EVA and an ionomer. In this event, the sealant layer containing the EVA/EBC/PP blend could optionally have an adjacent layer containing polypropylene homopolymer or copolymer, thereby providing the "tear-out" mechanism described above.

A package made in accordance with the present invention is especially suitable for the packaging of food products such as link sausage and smoked link sausage.

A major advantage and improvement of the present invention lies in the easy opening of packages made with the dissimilar sealants of the invention. In some cases peel strengths are considerably lower than those resulting from sealant combinations utilized in the past, but without significantly impairing package integrity.

Seal tests referred to below indicate peel strengths at room temperature, tested either soon after sealing (off-line) or 24 hours after the package was made. Structure numbers refer by number to the structures described earlier in the specification.

Peel strengths are in pounds per linear inch at 73° F.

In each of Tables 1 through 4, a first web was sealed to a second web and the peel strengths were determined.

Referring to Table 1, a first web having an ionomer sealant layer and a polyester abus layer was sealed to a second web of structure No. 2 (see Group I above). The data indicates the very low peel strengths i.e. easy openability essentially the same for off line and 24 hour tests. Two difference sealing conditions were used as indicated, with 6 samples taken under each sealing condition.

TABLE I

| SEALING CONDITIONS | SAMPLE | PEEL STRENGTH (OFF-LINE) | PEEL STRENGTH (24 HOURS) |
|---|---|---|---|
| 300° F./40 P.S.I. .5 Sec. Dwell Time | 1 | 0.6 | 0.5 |
| | 2 | 0.7 | 0.5 |
| | 3 | 0.6 | 0.6 |
| | 4 | 0.6 | 0.5 |
| | 5 | 0.7 | 0.5 |
| | 6 | 0.6 | 0.5 |
| 250° F./70 P.S.I. .7 Sec. Dwell Time | 1 | 0.5 | 0.6 |
| | 2 | 0.4 | 0.5 |
| | 3 | 0.5 | 0.6 |
| | 4 | 0.6 | 0.6 |
| | 5 | 0.6 | 0.6 |
| | 6 | 0.5 | 0.5 |

Table 2 below represents peel strength data taken under conditions similar to those described above for Table 1.

Structure Nos. 2 and 23 (see above) were used to form the package samples of Table 2.

TABLE 2

| SEALING CONDITIONS | SAMPLE | PEEL STRENGTH (OFF-LINE) | PEEL STRENGTH (24 HOURS) |
|---|---|---|---|
| 300° F./40 P.S.I. .5 SEC. DWELL TIME | 1 | 2.1 | 2.3 |
| | 2 | 2.5 | 2.6 |
| | 3 | 2.0 | 2.3 |
| | 4 | 2.3 | 2.3 |
| | 5 | 2.1 | 2.2 |
| | 6 | 2.1 | 2.1 |
| 250° F./70 P.S.I. .7 SEC. DWELL TIME | 1 | 2.0 | 2.0 |
| | 2 | 2.3 | 2.0 |
| | 3 | 2.1 | 2.4 |
| | 4 | 1.9 | 2.1 |
| | 5 | 2.0 | 2.1 |
| | 6 | 2.1 | 2.0 |

The first web for the packaging materials represented by the samples of Table 3 was the same as that for the materials of Table 1. The second web was structure No. 21. Sealing and test conditions were substantially the same as the previous samples, but peel strength data was taken for offline strengths only.

TABLE 3

| SEALING CONDITIONS | SAMPLE | PEEL STRENGTH (OFF-LINE) | PEEL STRENGTH (24 HOURS) |
|---|---|---|---|
| 300° F./40 P.S.I. .5 SEC. DWELL TIME | 1 | 0.8 | — |
| | 2 | 0.6 | — |
| | 3 | 0.8 | — |
| | 4 | 0.7 | — |
| | 5 | 0.6 | — |
| | 6 | 0.7 | — |
| 250° F./70 P.S.I. .7 SEC. DWELL TIME | 1 | 0.8 | — |
| | 2 | 0.8 | — |
| | 3 | 0.5 | — |
| | 4 | 0.6 | — |
| | 5 | 0.7 | — |
| | 6 | 0.8 | — |

The web of the samples of Table 4 were structure Nos. 21 and 23. Sealing conditions were substantially the same as in Table 3.

TABLE 4

| SEALING CONDITIONS | SAMPLE | PEEL STRENGTH (OFF-LINE) | PEEL STRENGTH (24 HOURS) |
|---|---|---|---|
| 300° F./40 P.S.I. .5 SEC. DWELL TIME | 1 | 2.2 | — |
| | 2 | 1.9 | — |
| | 3 | 2.0 | — |
| | 4 | 1.8 | — |
| | 5 | 1.9 | — |
| | 6 | 1.9 | — |
| 250° F./70 P.S.I. .7 SECS. DWELL TIME | 1 | 2.1 | — |
| | 2 | 1.9 | — |
| | 3 | 1.6 | — |
| | 4 | 2.2 | — |
| | 5 | 2.0 | — |
| | 6 | 1.9 | — |

While the above description has presented illustrative examples of the invention, those skilled in the art will readily perceive modifications to the invention after review of this description. Such modifications are well-within the spirit and scope of the claims as defined below.

What is claimed is:

1. A package having a peel opening force of less than about 2.5 inch comprising:

(a) a first web including a sealant layer comprising a polymeric material selected from the group consisting of ionomer, and a blend of said ionomer and ethylene vinyl acetate copolymer;

(b) a second web including a sealant layer comprising a blend of (i) ethylene vinyl acetate copolymer,
(ii) ethylene 1-butene copolymer, and
(iii) polypropylene; and (c) the first and second webs heat-sealed to each other and enclosing an article.

2. A package according to claim 1 further comprising an additional layer adjacent the sealant layer of the second web, and comprising a propylene homopolymer or copolymer.

3. A package having a peel opening force of less than about 2.5 pounds per inch comprising:
(a) a first web including a sealant layer comprising a polymeric material or blend of polymeric materials which form a heat seal, with a sealant layer of a second web, of greater than about 2.5 pounds per inch peel opening force;
(b) a second web including a sealant layer comprising a blend of
   (i) ethylene vinyl acetate copolymer,
   (ii) ethylene 1-butene copolymer, and
   (iii) polypropylene; and
(c) the second web further including a layer, adjacent the sealant layer, comprising a propylene homopolymer or copolymer.

4. A package having a peel opening force of less than about 2.5 pounds per inch comprising:
(a) a first web comprising a core layer of ethylene vinyl alcohol copolymer, intermediate layers on each surface of the core layer comprising a polyamide, an outer layer of polypropylene, and a sealant layer of ionomer, said outer and sealant layers each bonded to a respective polyamide layer by means of an adhesive layer;
(b) a second web comprising a sealant layer of a blend of ethylene vinyl acetate copolymer, ethylene butene copolymer, and polypropylene, a layer adjacent the sealant layer comprising ethylene vinyl acetate copolymer, a print layer, an adhesive layer between the print layer and ethylene vinyl acetate layer, and an outer layer of biaxially oriented nylon;
(c) said first and second webs heat sealed to each other and enclosing an article.

* * * * *

UNITED STATES PATENT AND TRADEMARK OFFICE
CERTIFICATE OF CORRECTION

PATENT NO. : 4,859,514

DATED : August 22, 1989

INVENTOR(S) : Steven G. Friedrich
Kent A. Davis

It is certified that error appears in the above-identified patent and that said Letters Patent is hereby corrected as shown below:

In column 14, line 5, after "2.5" insert --pounds per--.

Signed and Sealed this

Fourteenth Day of May, 1991

Attest:

*Attesting Officer*

HARRY F. MANBECK, JR.

*Commissioner of Patents and Trademarks*